Patented May 21, 1946

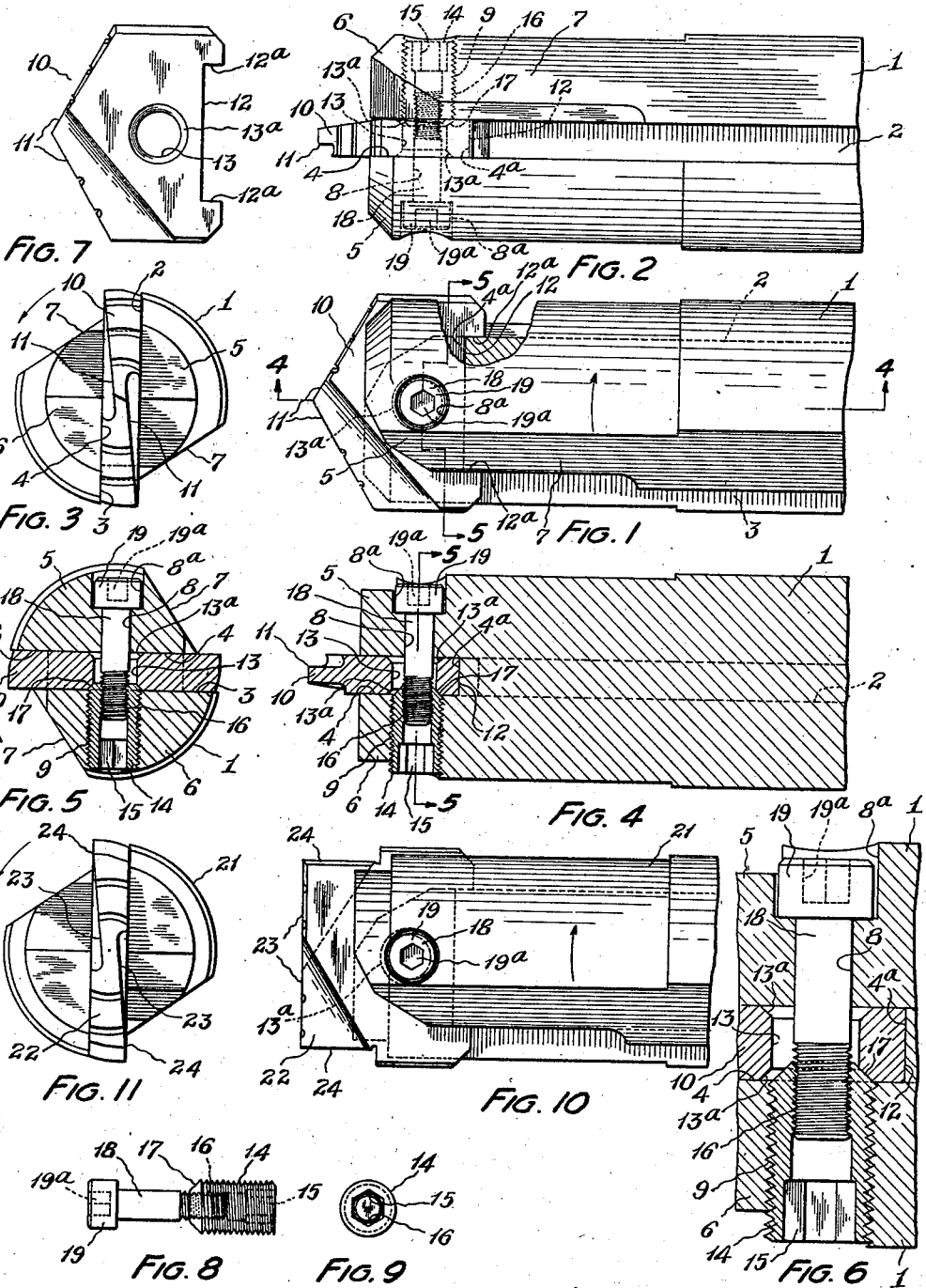

2,400,856

UNITED STATES PATENT OFFICE 2,400,856

CUTTING TOOL

John Thompson, Cleveland, Ohio, assignor to The Pipe Machinery Company, Cleveland, Ohio, a corporation of Ohio Application July 16, 1943, Serial No. 495,055

3 Claims. (Cl. 77—58)

This invention relates to cutting tools in which one or more cutter bits are removably mounted in a support or body.

It is an object of the invention to provide a tool having improved means for operatively mounting a cutter bit in the tool body.

More specifically, it is an object of the invention to provide a tool in which the parts are constructed and arranged in an improved manner to provide strong and rigid support for the cutter bit or bits with a tool body of minimum size and weight.

A further object of the invention is to provide a tool with clamping means capable of supporting a cutter bit in its support without vibration or chatter during operation.

Another object of the invention is to provide an improved screw-threaded clamping device that is simple and compact in construction and suitable for use in a wide variety of tools.

Still another object of the invention is to provide a clamping screw of novel design which can be produced at low cost.

With the foregoing and other incidental objects in view, the invention consists in certain forms, arrangements and combinations of parts which are hereinafter explained as embodied in exemplary tools shown in the accompanying drawing and which are defined in the claims.

In the drawing,

Fig. 1 is a side elevation of a tool embodying the present invention.

Fig. 2 is a plan view of the same tool.

Fig. 3 is a front end elevation of the same tool.

Fig. 4 is a longitudinal section on the line 4—4 of Fig. 1.

Fig. 5 is a transverse section on the line 5—5 of Fig. 4.

Fig. 6 is an enlarged fragmentary view showing the screw clamping devices which are illustrated on a smaller scale in Fig. 4.

Fig. 7 is a side elevation of a cutter bit detached from the tool body.

Fig. 8 is a side elevation of the clamping screw assembly shown in Fig. 4.

Fig. 9 is a right end view of one of the clamping screws.

Figs. 10 and 11 are a side elevation and front end view, respectively, of a tool differing somewhat from that shown in Figs. 1 to 9.

Referring in detail to the construction illustrated in Figs. 1 to 9, inclusive, 1 designates as an entirety the body of the tool. It is formed with two diametrically-opposite, longitudinally-extending slots or grooves 2, 3 and its front end is formed with a diametral slot 4 which divides said end into two opposite jaws 5, 6. The opposite faces of the jaws 5, 6 are parallel plane surfaces which are joined, at the bottom of the slot, by a plane transverse surface 4ª. For a purpose which will later be explained, the body 1 has diametrically opposite portions cut away at 7, 7 (Figs. 2 and 3).

The jaw 5 of the tool bit is formed with a radial transverse hole 8, the outer end of which is countersunk at 8ª; and the jaw 6 is formed with an aligning radial hole 9 which is threaded interiorly.

10 is a cutter bit designed for drilling operations. This bit has parallel flat faces and its thickness dimension is such that it has a close sliding fit between the jaws 5 and 6 of the tool body. The cutter bit has its front edges suitably ground to provide converging cutting edges 11, 11 and its rear edge is recessed symmetrically with relation to the axis of the tool to provide a plane transverse surface 12 which engages the abutment surface 4ª of the tool body and oppositely facing shoulders or surfaces 12ª, 12ª which engage the bottoms of the grooves 2 and 3, as indicated in Fig. 1. The bit 10 is pierced with a round hole or aperture 13 which is chamfered or countersunk in at least one end and preferably at both ends, as indicated by numerals 13ª, 13ª (Fig. 4).

The tool bit is rigidly clamped in the body of the tool by screw devices comprising a screw 14 which is externally threaded to fit the internal threads of the transverse hole in the jaw 6. At its outer end screw 14 is provided with a wrench socket 15 and at its other end said screw is formed with an internally-threaded, axially-extending hole 16. The inner end of the screw 14 is formed with a tapering bevel or chamfer 17 to engage a countersink 13ª of the bit 10. As will be seen from an inspection of Fig. 4 or Fig. 6, when the bit 10 is inserted between the jaws 5 and 6 and screw 15 is turned to bring its tapered inner end against the bit the screw acts as a cam to force the bit rearward and hold its rear edge surface 12 firmly against the abutment surface 4ª of the tool bit, the hole 13 being large enough so that only the rear side of the screw 14 engages the bit. The shoulders 12ª center the bit and firmly hold it against radial sliding movement so that the cam engagement between screw 14 and the bit is not materialy stressed in a transverse direction parallel to the plane of the bit.

It will be apparent that the screw 14 when it is forced against the cutter bit tends to separate the jaws 5 and 6 of the tool bit. In the improved construction this action is effectively overcome by a clamping screw 18 which has a close sliding fit in the hole 8 of the jaw 5. The screw 18 is formed with a head 19 which is received by the countersink 8ᵃ in the jaw 5 and said head is preferably formed with a wrench socket 19ᵃ. The inner threaded end of the screw 18 operatively engages the internal threads of the screw 14. It will be seen that when the screw 14 has been tightened against the cutter bit and the screw 18 has been tightened in the screw 14 a strong tension is set up in the shank of the screw 18 which draws the jaws 5 and 6 of the tool bit together. Consequently the combined effects of the clamping screws 14 and 18 are to force the cutter bit rearward into firm contact with the abutment surface 4ᵃ of the tool bit and to draw the jaws 5 and 6 together so that the cutter bit is rigidly clamped between the jaws and all parts of the entire front end structure of the tool are bound together so that the bit is effectively held against vibration or chatter. Also as a result of the action of the clamping screws 14 and 18 each of the clamping jaws 5 and 6 lends strength to the other and the size and weight of the tool body to attain the requisite strength are reduced to a minimum.

As has been stated, the thickness of the cutter bit 10 is made such that the bit has a close sliding fit between the jaws 5 and 6 of the tool body. When thus properly fitted the jaws 5 and 6 may be brought into close clamping engagement with the bit when the clamping screw 18 is tightened without exceeding the elastic limit of the stressed parts. For example, in the case of the tool which has been described, with a tool body 1¾" in diameter and a cutter bit 0.312" thick a total clearance of from 0.0005" to 0.001" between bit and jaws is suitable.

Because of the compactness of the improved tool construction, its relatively light weight and the ease with which all of the parts can be fabricated and assembled the operative advantages which have been mentioned are attained at relatively low cost. In addition, as will be apparent, the cutter bits can be mounted or removed for grinding with great ease.

From an inspection of Figs. 3 and 5 it will be seen that the cutter bit is strongly supported by the tool body at its rear side well out toward the maximum diameter of the bit while the relief of the tool body at 7, 7 affords suitable accommodation for chips removed by the bit in the operation of the tool.

Figs. 10 and 11 show a slightly modified form of tool comprising a body 21 and a cutter bit 22 which is of a form suitable for cylindrical counterboring operations, the bit 22 having front cutting edges 23, 23 and side cutting edges 24, 24. In other respects the construction of the bit may be similar to that of bit 10. Also, the construction of the tool body 21 is similar to the body 1 of the other tool except for minor differences of form corresponding to the different form of the bit 22. The screw clamping devices of the tool shown in Figs. 10 and 11 are like those shown in the first described tool so that further description is unnecessary.

In the tools illustrated in the drawing the tool bodies are supplied with a single cutter bit but, from the nature of the invention, it will be readily understood that it is applicable to tools having a plurality of cutters. In fact, the essential features of the invention can be utilized wherever a tool body or support can be slotted to form supporting jaws for a cutter.

While the headed clamping screw of the improved tool is preferably anchored to the opposite jaw of the tool body through the cam clamping screw, the invention in its broader aspects is not limited to this specific feature. Also various other features of the invention as illustrated in the drawing are subject to variation within the bounds of the appended claims.

What is claimed is:

1. In a cutting tool, the combination of a body formed with opposite jaws having parallel inner surfaces and with a transverse abutment surface disposed between said parallel surfaces at the supported ends of the jaws, each jaw of the body being formed with a transverse hole and the two holes being oppositely disposed; a cutter bit fitting between the jaws of the body with a close sliding fit and with its inner edge engaging the abutment surface of the body, the bit having an aperture disposed between the holes in the jaws of the body; a cam screw having threaded engagement with the walls of the hole in one of the jaws and a cam engagement at its inner end with the cutter bit acting to press the latter against both the abutment surface and the other jaw of the body when said screw is turned inward, the said cam screw having a longitudinally extending threaded hole in its inner end; and a headed screw rotatably anchored in the hole in the said other jaw of the body with its shank piercing the apertured bit and its threaded end engaging the internal threads of the other screw, whereby the tightening of the headed screw draws the two jaws together in opposition to the opposing thrust of the cam screw.

2. A tool as claimed in claim 1 in which the cam screw has its cam engagement against the edge of the bit aperture.

3. A tool as claimed in claim 1 in which the bit aperture is formed with a bevelled countersink and the cam screw has a bevelled inner end to engage the said counter-sink.

JOHN THOMPSON.